(12) United States Patent
Blackmore

(10) Patent No.: US 10,137,500 B2
(45) Date of Patent: Nov. 27, 2018

(54) METHOD OF MANUFACTURING A COMPONENT

(71) Applicant: ROLLS-ROYCE PLC, London (GB)

(72) Inventor: Michael Lewis Blackmore, Sheffield (GB)

(73) Assignee: ROLLS-ROYCE plc, London (GB)

( * ) Notice: Subject to any disclaimer, the term of this patent is extended or adjusted under 35 U.S.C. 154(b) by 978 days.

(21) Appl. No.: 14/337,604

(22) Filed: Jul. 22, 2014

(65) Prior Publication Data
US 2015/0037599 A1 Feb. 5, 2015

(30) Foreign Application Priority Data
Aug. 2, 2013 (GB) .................................. 1313840.9

(51) Int. Cl.
*B23K 26/342* (2014.01)
*B22F 3/105* (2006.01)
*B23K 15/00* (2006.01)

(52) U.S. Cl.
CPC .......... *B22F 3/1055* (2013.01); *B23K 15/002* (2013.01); *B23K 15/0013* (2013.01);
(Continued)

(58) Field of Classification Search
CPC .. B23K 26/342; B23K 15/00; B23K 15/0086; B23K 15/0046
(Continued)

(56) References Cited

U.S. PATENT DOCUMENTS

| 5,325,582 A * | 7/1994 | Glaser ................ G05B 19/4183 209/573 |
| 7,107,118 B2 * | 9/2006 | Orozco .................. B23K 26/03 219/121.61 |

(Continued)

FOREIGN PATENT DOCUMENTS

| DE | 10 2011 006 941 A1 | 5/2012 |
| WO | WO 2012/069037 A2 | 5/2012 |

(Continued)

OTHER PUBLICATIONS

Search Report issued in British Application No. GB1313840.9 dated Mar. 21, 2014.

(Continued)

*Primary Examiner* — Michael LaFlame, Jr.
(74) *Attorney, Agent, or Firm* — Oliff PLC

(57) ABSTRACT

A method of manufacturing a component using electron beam melting includes providing a powder layer; selectively melting at least a part of the powder layer so as to generate a solid layer of the component using a first electron beam; identifying any defects in the solid layer by scanning the solid layer using a second electron beam; and then repeating these steps at least once so as to build up a shape corresponding to the component. The second electron beam has a lower power than the first electron beam. The method may also include steps of removing any identified defects in the solid layer by using the first electron beam to re-melt at least a part of the solid layer, and adjusting one or more parameters of the selective melting step so as to avoid future recurring defects based on stored data relating to the scanned solid layer.

20 Claims, 4 Drawing Sheets

(52) U.S. Cl.
CPC .. *B23K 15/0086* (2013.01); *B22F 2003/1056* (2013.01); *Y02P 10/295* (2015.11); *Y10T 428/12028* (2015.01)

(58) Field of Classification Search
USPC ... 219/121.6, 121.7, 121.35, 121.65, 121.66, 219/121.83, 121.85
See application file for complete search history.

(56) References Cited

U.S. PATENT DOCUMENTS

| | | | |
|---|---|---|---|
| 2004/0019403 A1* | 1/2004 | Liu | B41J 2/161 700/166 |
| 2005/0173380 A1 | 8/2005 | Carbone | |
| 2007/0176312 A1 | 8/2007 | Clark et al. | |
| 2008/0154423 A1* | 6/2008 | Badarinarayan | B23K 31/125 700/175 |
| 2013/0055568 A1 | 3/2013 | Dusel et al. | |
| 2013/0280439 A1 | 10/2013 | Hess et al. | |

FOREIGN PATENT DOCUMENTS

| | | |
|---|---|---|
| WO | 2013/098054 A1 | 7/2013 |
| WO | 2015/091813 A1 | 6/2015 |

OTHER PUBLICATIONS

Apr. 20, 2017 Office Action issued in European Patent Application No. 14178256.5.

Dec. 19, 2014 Search Report issued in European Application No. 14 17 8256.

\* cited by examiner

METHOD OF MANUFACTURING A COMPONENT

CROSS-REFERENCE TO RELATED APPLICATIONS

This application is based upon and claims the benefit of priority from British Patent Application Number 1313840.9 filed 2 Aug. 2013, the entire contents of which is incorporated by reference.

BACKGROUND OF THE INVENTION

1. Field of the Disclosure

The present invention relates to a method of manufacturing a component. In particular, the present invention relates to manufacturing a component using additive layer manufacture.

2. Description of the Related Art

Additive layer manufacturing (ALM) methods using electron beam melting (EBM) may be used to manufacture metallic components by sequential selective melting of thin metal powder layers. According to such a method, a layer of metal powder is deposited onto a surface (or plate), and an electron beam is used to selectively melt the powder layer. The melted material then solidifies so as to form a metallic layer of the desired shape. A further layer of powder is then deposited, and the electron beam is used to selectively melt the further powder layer, which then solidifies to form another metallic layer of the desired shape onto the previous metallic layer. The process is repeated until the final 3D geometry has been built up by selective melting and solidification of multiple layers.

The process can operate directly from a 3D CAD model of the geometry to be manufactured, and may not require any specific tooling to be produced for a particular geometry or component. Accordingly, EBM can be used to generate parts having complex 3D free-form geometry, with short lead times.

Typically, a 3D CAD model of the geometry to be produced is virtually sliced into a series of thin, pseudo 2D, slices equal to the layer thickness generated when the electron beam melts a single powder layer. The thin slices of the geometry are then used to generate an electron beam melting path for each layer. This process may be used as part of or along with the present invention.

The electron beam may use any desired path for melting each layer. For example, the contour (or outline) of the layer may first be melted by the beam, and then the bulk of the layer may be melted, for example by hatching, i.e. rastering the beam back and forth along parallel vectors. Once a layer has been completed, the partially manufactured component may be stepped downwards, away from the electron beam, to allow the next powder layer to be deposited and melted.

OBJECTS AND SUMMARY

Manufacturing components using EBM has many advantages, including the possibility to manufacture complex 3D shapes with little or no bespoke tooling, but the final components can have defects. The defects may be small melt-related defects in line with the stochastic natural of distributing and melting tens of millions of powder grains with small variations in process parameters and powder particles. Additionally or alternatively, defects may be caused by unsuitable selection of process parameters, such as inappropriate rastering speed. Such defects may result in undesirable properties, and may limit the use of the finished components to certain applications and/or necessitate further processing steps (such as hot isostatic pressing, or HIP) to remove the defects in order for the components to have the required properties for a given application.

It is therefore desirable to produce components using EBM that have fewer and/or smaller defects.

According to an aspect, there is provided a method of manufacturing a component using electron beam melting. The method comprises providing a powder layer. The method comprises selectively melting at least a part of the powder layer so as to generate a solid layer of the component using a first electron beam. The method comprises identifying any defects in the solid layer by scanning the solid layer using a second electron beam. The method comprises repeating the steps of providing the powder layer, selectively melting at least a part of the powder layer, and identifying any defects in the solid layer at least once so as to build up a shape corresponding to the component. The power of the second electron beam is lower than the power of the first electron beam.

Accordingly, the solid layer generated by selectively melting the powder layer may be scanned by the second electron beam to identify defects directly after the layer has solidified. Thus, the solid layer itself may be directly scanned by the second electron beam. No processing (for example machining) of the solid layer may be performed before it is scanned by the second electron beam. This may minimize the number of steps required to manufacture a high quality component using electron beam melting from a powder layer, thereby optimizing the efficiency of the process.

The step of identifying defects in the solid layer (which may be a solid metallic layer) may comprise detecting back scatter from the electrons of the second electron beam used to scan the solid layer (which may be a solid metallic layer). Any suitable detector may be used for detecting the back-scattered electrons.

The second electron beam may be used to identify any defects without performing further, unwanted, melting by providing it with a suitably lower power than the first electron beam. Thus, the power of the first electron beam may be sufficient to perform selective melting of the powder layer, but the power of the second electron beam may be insufficient to perform selective melting of the powder layer.

The component may be said to be manufactured in a "layerwise" manner, that is to say by forming one solid (metallic) layer on top of another layer. The component may be a metallic component. The built-up shape corresponding to the component may actually be the component itself, or may be a shape that requires one or more further manufacturing and/or finishing steps (such as, by way of example only, machining or HIP) in order to produce the final component. The part-built component may be moved (or stepped) away from the electron beam source before the next layer of powder material is provided.

The first electron beam used to selectively melt at least a part of the powder layer may selectively melt more than one area of the powder layer substantially simultaneously. In this way, the selective melting step may comprise generating multiple melt pools in the powder layer substantially simultaneously. Purely by way of example, up to 50 or 100 melt pools may be generated simultaneously. This may be achieved in any suitable manner. For example, the first electron beam may be rapidly moved around the powder layer to generate multiple weld pools substantially simultaneously. Additionally or alternatively, the first electron beam may in fact comprise multiple beams that are focussed on the powder layer substantially simultaneously in order to generate multiple weld pools at a given time. Such multiple beams, where used, may be generated by splitting a single generated beam or by generating multiple beams, for example. Where present, such multiple beams fall within the term "first electron beam" as used herein.

According to an aspect, there is provided an additive layer manufacturing machine for manufacturing a component (which may be a metallic component). The machine comprises a base plate on which the component is manufactured. The machine comprises a powder delivery device for delivering successive layers of powder (which may be metal powder) onto the baseplate (including for delivering layers of powder onto previously formed solid layers on the baseplate). The apparatus comprises an electron beam source for generating a first electron beam for selectively melting at least a part of the powder layer so as to produce a solid layer (which may be a solid metallic layer). The apparatus comprises an electron beam source for generating a second electron beam for scanning the solid layer. The apparatus comprises a backscatter detector for receiving backscattered electrons from the surface of the solid layer resulting from the scan by the second electron beam to identify any defects in the solid layer. The respective electron beam sources generate (for example are configured to generate) the second electron beam to have a lower power than the first electron beam.

In all aspects, the powder layer may be an electrically conductive powder layer. The powder layer may comprise any electrically conductive particles, for example any particles whose surface at least is electrically conductive. The powder layer may be a metal powder layer, as referred to elsewhere herein. The solid layer may be a solid metallic layer, as referred to elsewhere herein. A metal powder layer may comprise any desired metallic powder grains or particles. For example, the metal powder may comprise solid metal particles and/or metal-coated particles.

The additive layer manufacturing machine may be an electron beam melting additive layer manufacture machine.

The electron beam source for generating the first electron beam may be the same as the electron beam source for generating the second electron beam. For example, at least one parameter may be changed for generating the second beam as opposed to the first beam, such as the power used by the source to generate the beams. This may result in a particularly compact and/or low cost additive layer manufacturing machine.

Alternatively, the electron beam source for generating the first electron beam may be different to the electron beam source for generating the second electron beam. Nevertheless, the two electron beam sources may be a part of the same additive layer manufacturing machine.

The ALM/EBM machines/methods according to the present invention allow defects to be detected in-situ. For example, any defects associated with a particular layer can be detected before the next layer of powder is supplied and melted. This may help to reduce the number/percentage of defective (for example scrap) components that are generated using ALM/EBM techniques, resulting in cost and/or efficiency savings. If a defect is detected during the manufacturing process rather than after the manufacturing process, a decision on the fate of the component (for example scrap, fixable, within tolerance) can be made before the remainder of the component is manufactured. This may further add to cost and/or efficiency savings.

By providing separate electron beams for melting and for identifying defects, both beams can be optimized for their specific purpose. This means that, for example, the power of the scanning electron beam used to identify defects can be optimized for high resolution of surface features. Thus, any defects can be detected to a high accuracy. This means that the tolerance band for defects can be tight, and so only those defects that require action (such as re-melting or scrapping of the component) are acted upon, further adding to the cost and/or efficiency savings.

The method may comprise removing any identified defects in the solid layer before providing the next powder layer. Such a step of removing any identified defects may comprise using the first electron beam to re-melt at least a part of the solid layer (for example re-melting the region of and/or around the defect, or re-melting the entire layer). This may include melting any powder that was left un-melted in error.

Removing any identified defects may result in higher quality components and/or a reduced percentage of scrapped components and/or a more efficient process.

After any defects have been removed, the method may comprise re-scanning at least a part of the solid layer using the second electron beam to confirm that the identified defects have been removed. For example, the entire solid layer may be re-scanned, or just the region(s) around any defect(s) may be re-scanned.

The method may comprise storing/recording (for example electronically) data relating to the layer scanned by the second electron beam. For example, the location and/or shape/size in the component of any identified defects may be recorded. Such location information may include, for example, the layer in which the defect was identified and the position within that layer. The data relating to the layer scanned by the second electron beam may be recorded regardless of whether or not the defect is subsequently removed. This may avoid the need to perform additional inspection or testing after the component has been manufactured.

The stored data may be used to determine whether any defects have been identified at the same position within the respective layers of two or more different solid layers, such defects being recurring defects. If any such recurring defects have been identified, one or more parameters of the selective melting step may be adjusted so as to avoid future recurring defects at that position. Such parameters may include, for example, the power and/or intensity of the first electron beam (for example the local power) and/or the scanning (or rastering) speed of the first electron beam, and/or the path (including the turning positions and/or rates) of the first electron beam.

The method may comprise generating an image of the solid layer, including any identified defects in the solid layer. The image may be stored for future reference. The image may be used to decide on the fate of the component, for example whether to remove any defects shown in the image, whether to scrap the component, or whether to proceed without taking any action (for example because any defects are within an acceptable tolerance).

If a defect is identified in the solid layer, the method may further comprise making a decision about whether or not to remove any identified defects in the solid layer before providing the next powder layer. The decision may be based on one or more predetermined criteria. Such a decision may result in a defect being removed by re-melting using the first electron beam, as described above and elsewhere herein.

The decision may result in no action being taken, for example if a defect is deemed to be within an acceptable tolerance.

The decision may be based at least in part on the size of the defect. For example, the decision may be based at least in part on the surface area and/or the depth of the defect. In this regard, the second electron beam may be able to determine a 3-D shape of the solid layer, and thus a 3-D shape of any defects.

Additionally or alternatively, the decision may be based on the location and/or the shape of the defect.

The decision may taken by a machine, for example without human intervention. Thus, the decision may be an automated decision, which may be based on one or more criteria, such as those described above and elsewhere herein.

Alternatively, the decision may be taken by an operator of the machine. Alternatively still, the decision may be taken by a combination of machine and operator. For example, the machine may automatically identify potential defects that may require corrective action, and an operator may take the final decision on whether any action is required.

The intensity of the second electron beam may be lower than the intensity of the first electron beam. Providing the second electron beam as lower intensity beam (for example a beam with a narrower energy distribution profile and/or lower maximum intensity) may allow a higher resolution scan of the solid layer, and thus may allow smaller defects to be identified.

BRIEF DESCRIPTION OF THE DRAWINGS

Embodiments of the invention will now be described with reference to the accompanying drawings, in which.

DETAILED DESCRIPTION OF THE PREFERRED EMBODIMENTS

As explained elsewhere herein, additive layer manufacturing (ALM) methods using electron beam melting (EBM) may be used to manufacture metallic components by sequential selective melting of thin powder layers.

Figure 1:
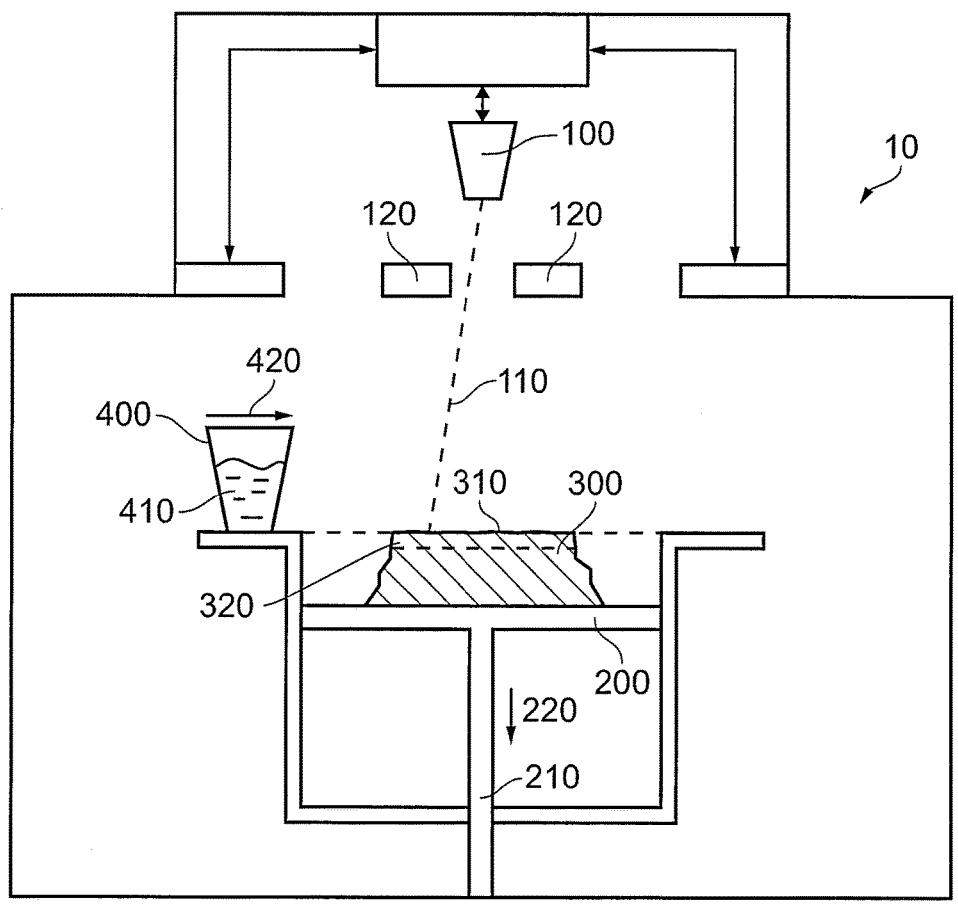
FIG. 1 shows an additive layer manufacture machine in accordance with the invention being used for selective melting.

An example of an additive layer manufacturing machine (or ALM machine) 10 for use in such a method is shown in FIG. 1. The ALM machine 10 comprises an electron beam source 100 for generating an electron beam 110 (which may be referred to as a first electron beam herein). In use, the electron beam 110 is focussed (and optionally split into multiple beams) using focusing elements 120, such as lenses and/or mirrors, towards a component 300 being manufactured. Specifically, the electron beam 110 is focussed onto a layer of powder (for example a layer of powder metal) 310 to be melted by the electron beam which subsequently solidifies to form a solid layer (for example a solid metal layer) of the component 300. The interior of the ALM machine 10, or at least the part of the interior of the ALM machine 10 through which electron beams travel may be a vacuum, or at least a partial vacuum.

In operation, the electron beam 110 scans over the metal powder layer 310 in a desired pattern so as to selectively melt the metal powder layer 310 in the correct shape required to manufacture that particular layer, or slice, of the component 300. The melted metal then solidifies to form the layer 320 of the component 300 in the desired shape. Thus, at least a part of the metal powder layer 310 is brought into a temporary molten state by the energy provided by the electron beam 110 such that when the material solidifies it forms at least part (in the form of a layer) of the component 300 being manufactured.

The component 300 sits on a base plate 200 that sits on a translatable support 210. The translatable support 210 may be moved using any suitable means in a direction 220 that is substantially perpendicular to the layers 320 of the component 300. After each layer 320 is completed, the translatable support 210 moves by a predetermined distance in the direction 220 that is substantially perpendicular to the layer 320. Thus, the base plate 200 and the component 300 also move in the direction 220, and may be said to be indexed downwards (for example away from the electron beam source 100).

After the translatable support 210 has been indexed downwards, another layer of metal powder is supplied on top of the previous completed, solidified, layer 320. Purely by way of example, a hopper 400 containing metal powder 410 may be moved across the top of the previous solidified layer 320, depositing the next layer of powder material 310 as it moves, as shown in FIG. 1 by way of example. In FIG. 1, the direction arrow 420 indicates the direction of movement of the hopper 400 across the component 300. Of course, the hopper 400 may move relative to the component 300 in directions other than indicated by arrow 420 in FIG. 1, for example to ensure full (or the desired) coverage of metal powder 410 in a metal powder layer 310. Such a process may be known as powder bed deposition. However, any other method or system may be used to deposit the next layer of powder material 310 without impacting upon any other aspect or feature of the invention. For example, the hopper 400 containing the metal powder 410 may be fixed, and the powder 410 may be distributed into a layer 310 using a powder spreading device (not shown). Such a powder spreading device may comprise a rake that collects powder from a hopper and then distributes the powder over the support 210 or previously solidified layer 320 (which may be collectively referred to as the build area).

The powder material 310 comprises powder particles. The powder particles may be of varying sizes. The powder particles may be spherical, or generally spherical. The powder particles may be any suitable material. The powder particles may be conductive powder particles. For example, the powder particles may be metallic powder particles. The term metallic powder particles may mean that the metal powder particles are solid metal particles, or metal coated particles, for example. Where the particles are metallic particles, any suitable metal may be used. Purely by way of example, the particles may comprise or consist of titanium and/or a titanium alloy and/or nickel and/or a nickel alloy. The thickness of the powder layer may be dependent on the application, for example the type of component being manufactured and/or the type of ALM machine 100 being used. Purely by way of example, the powder layer 500 may have a thickness in the range of from 0.01 mm to 1 mm, for example 0.02 mm to 0.5 mm, for example 0.05 mm to 0.25 mm, for example 0.07 mm to 0.2 mm. However, it will be appreciated that powder layer thickness outside this range may be used.

After the layer 310 of metal powder has been deposited, the electron beam 110 is used to selectively melt a portion of the powder so as to form the next layer 320 of the component 300, as described above.

According to an aspect of the invention, after selective melting, and subsequent solidification, of a given powder layer 310, the resulting solidified layer 320 is inspected to determine if any defects are present in the solidified layer 320. This may be performed before the base plate 200 is moved (or indexed) to the position for receiving the next powder layer 310, i.e. before the translatable support 210 is moved in the direction of arrow 220 in the FIG. 1 example.

Thus, before each layer is determined to be complete, and the base plate is moved (or indexed) to its next position, the solid metal layer 320 is inspected to identify any defects in the layer.

The inspection is performed using a second electron beam 510. The second electron beam 510 is configured to detect defects in the solidified layer 320, and therefore has different properties to the first electron beam 110 described above in relation to FIG. 1, which is arranged to selectively melt the metal powder layer 310. The second electron beam 510 may have a lower power and/or a lower intensity (for example a lower maximum intensity) than the first electron beam 110.

Figure 2:
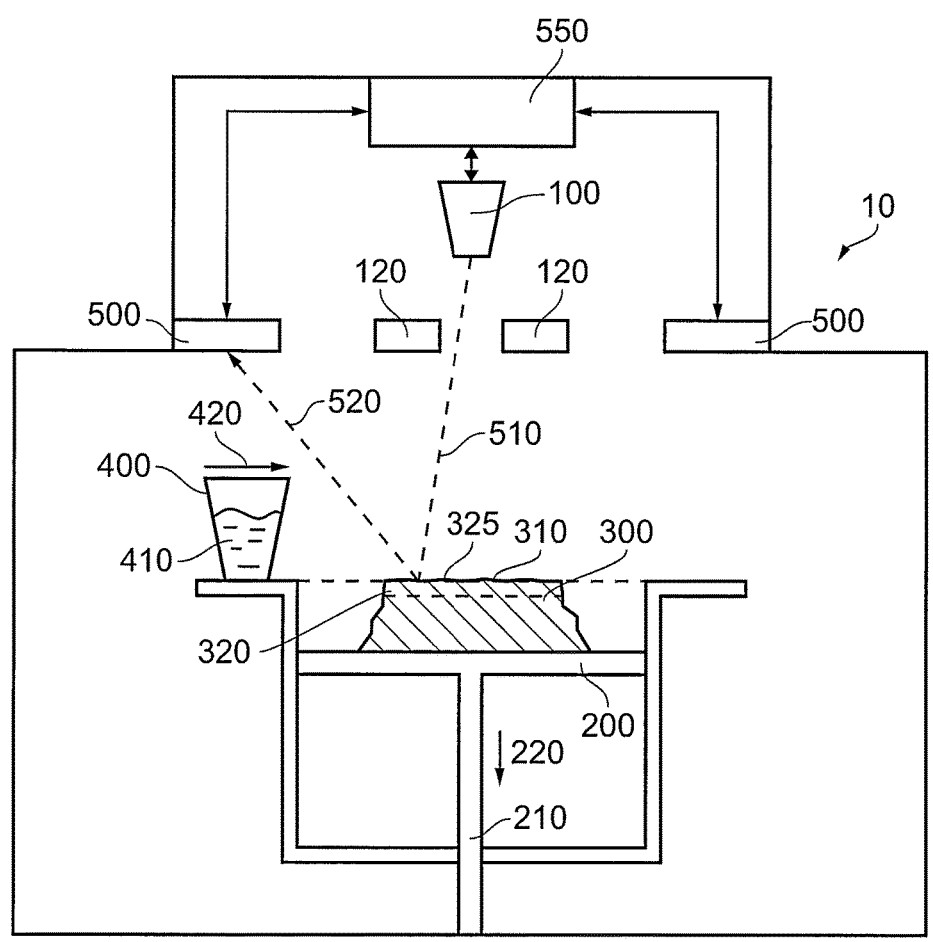
FIG. 2 shows an additive layer manufacture machine in accordance with the invention being used for identifying defects.

The second electron beam 510 may be generated using the same electron beam source 100 (which may be a so-called electron gun) as that used to generate the first electron beam 110, as shown in the FIG. 2 example. The ALM machine 10 may comprise a control unit 550 that may control the electron beam source 100 so as to switch between the first electron beam 110 and the second electron beam 510 as desired, as shown in the FIG. 2 example. Thus, for example, the control unit 550 may control the power and/or intensity of the electron beam 110, 510 generated by the electron beam source 100 so as to switch between the first electron beam 110 and the second electron beam 510.

In FIG. 2, the second electron beam 510 (which may be referred to as a measurement electron beam 510) interacts with the most recently solidified (or top) layer 320 of the component 300. The back-scattered electrons (indicated by the dashed line 520 in FIG. 2) from this interaction are detected by a detector 500. The pattern of the detected back-scattered electrons 520 can be used to determine the topography of the surface 325 of the solidified layer 320. The detector 500 may measure, for example, the intensity of the interaction of the second electron beam 510 with the layer 320 and/or electromagnetic radiation released as a result of the second electron beam 510 impinging on the layer 320.

In operation, the second electron beam 510 may scan across the surface 325 of the solidified layer 320, thereby determining the topography of at least a part, for example all, of the surface 325. Such a process may be known as rastering the second electron beam 510 across the solidified layer 320. In this way, the second electron beam 510 may be said to act like a scanning electron microscope.

Thus, the back-scattered electrons 520 can be used to identify any defects that may be present in the solidified layer 320. Such defects may include, for example, dimples and/or un-melted regions which may form porous zones in the finished component 300, and which may thus affect mechanical and/or geometrical properties of the finished component 300.

The detected back-scattered electrons 520 may be processed, for example using the processor 550, and imaging equipment may be used to show the topography of the surface 325 of the layer 320 as determined by the detected back-scattered electrons 520.

Figure 3:
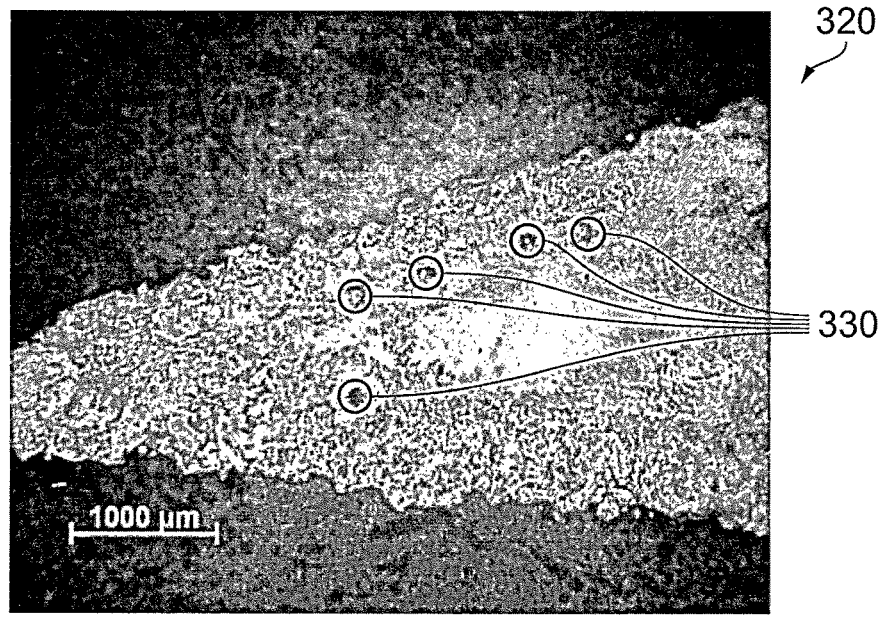
FIG. 3 shows an etched optical image of an example of melt defects in a solidified layer that has been melted by an additive layer manufacture machine.
Figure 4:
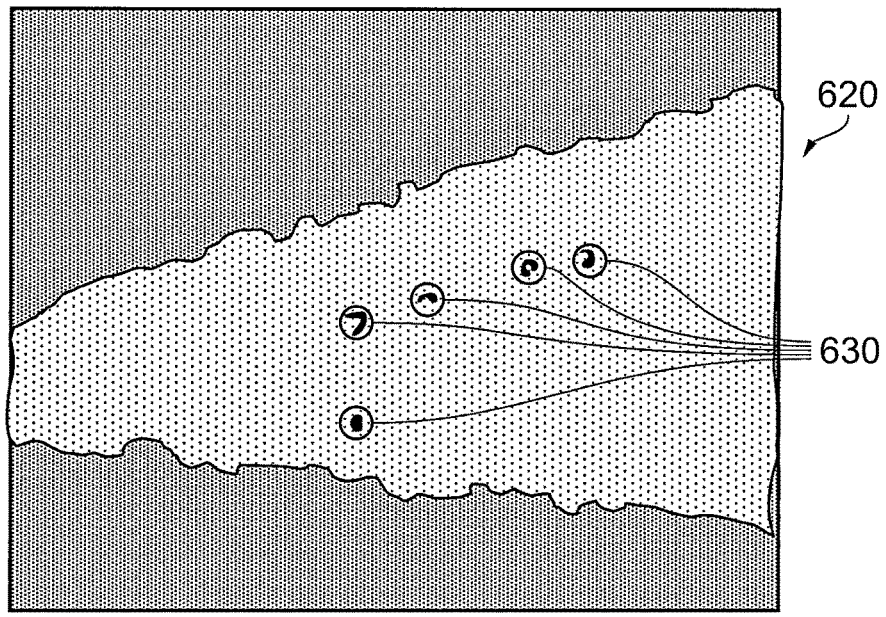
FIG. 4 shows the layer and melt defects of FIG. 3 as detected by an additive layer manufacture machine according to the invention.

Such imaging equipment may show defects as dark patches. FIGS. 3 and 4 show an example of defects in a solidified layer 320 of a component 300 that has been generated using an ALM machine 10. FIG. 3 is an etched optical image of the actual component layer 320, and FIG. 4 is a processed image 620 of the component layer 320 generated using the back-scattered electrons 520 from the second electron beam 510.

As shown in FIG. 3, the solidified layer 320 comprises a plurality of defects 330. In the image 620 of FIG. 4 generated using the second electron beam 510, the defects 330 are shown as dark patches 630. In FIG. 4, the detected back-scattered electrons 520 have been passed through an image processor, which may be a part of the control unit 550. Such an image processor 550 may show dark patches where the detected back-scattered electrons 520 have a parameter above a threshold value, indicating a defect. Such a threshold may be calculated in any suitable manner, for example by comparing the brightness (or energy) at a position with the average brightness or energy across the image. It will be appreciated, however, that in some arrangements no image 620 may be generated, and the information from the back-scattered electrons 520 may be acted upon directly (as discussed below, for example).

Once any defects 330 have been identified using the second electron beam 510, a decision may be taken as to how to address the defect 330. For example, at least a part of the layer 320 may be re-melted using the first electron beam 110 in order to remove the defect(s) 330. For example, all of the layer 320 may be re-melted or just the region of the defect 330 (which may include a region surrounding the defect 330) may be re-melted. Before re-melting, additional metal powder 410 may or may not be be added (for example in the region of the defect 330), for example using the hopper 400. The precise steps to be taken to remove a defect 330 (such as which region to re-melt, the scanning path of the melting electron beam 110 required to perform the re-melting, and whether to provide more powder 410 to the defect region) may be controlled by the processor 550.

By way of further example, the identified defect 330 may be simply left unchanged, and thus may not be removed. For example, once a defect 330 has been identified, a decision may be made with regard to whether to remove the defect (for example by re-melting), or to leave the defect unchanged. The decision may be based on, for example, the size of the defect 330, for example the cross-sectional area of the defect 330 (as illustrated by the dark patches in FIG. 4) and/or the depth of the defect 330 (into the page of FIG. 4). In this regard, using an electron beam 510 to scan the upper layer 320 may be particularly beneficial because it allows 3-D data (or information) about the upper layer 320 to be gathered, and thus the depth of any defect 330 can be established. Additionally or alternatively, a decision regarding whether or not to remove a defect may be taken based on any other information, such as the shape of the defect 330 (for example whether its shape would be likely to lead to any crack initiation or propagation), and/or the location of the defect (for example whether it will be at or near to a surface of the finished component 300).

The decision as to whether to remove a given defect 330 may be taken automatically (for example using an algorithm based on criteria such as those described herein), for example by the processor 550 based on the data provided from the electron detector 500. Additionally or alternatively, the decision may be taken by an operator, for example based on examination of an image 620/630 of the defect(s) 330, which may be generated by the processor 550 based on the data provided by the electron detector 500.

Regardless of the decision, data representing the solidified layer 320 that is gathered by the electron detector 500 from the back-scatter electrons 520 may be stored, for example as electronic data. Additionally or alternatively, images 620 representing the layer 320 may be stored. Data and/or images may be stored for the entire component, for example for each layer 320. Accordingly, the need to perform additional inspection and/or testing after the component 300 has been manufactured may be avoided, thereby saving time and expense. Furthermore, performing in-situ identification of defects using an electron beam 510 may be more accurate than conventional non-destructive inspection (such as X-ray inspection) of the finished component 300. This may be particularly advantageous for components with thick walls or cross-sections, for which conventional non-destructive inspection may have limited capability. Where appropriate, images and/or data relating to the scanned layer(s) 320 may be stored both for the original layer 320, and for the layer 320 after defects 330 have been identified and removed.

Stored data representing the solidified layer 320 may be used to update and/or optimize the parameters of the selective melting step, for example for subsequent layers 320 and/or components 300. For example, the data may show that defects 330 occur at the same position in different layers 320. If such defects were not removed, they may stack up on top of each other, leading to significant porosity, and may thus be referred to as "stacking defects". This may indicate that one or more parameters used to melt the layer 320 using the first electron beam 110 needs to be changed, or optimized, in order to avoid the defects 330 occurring at the corresponding positions in subsequent layers 320 and/or components 300. For example, a particular area of each layer 320 may not be receiving sufficient energy (for example energy per unit area or volume) from the first electron beam 110 to correctly melt that area. In that case, one or more of many different parameters of the selective melting step may be adjusted to address the problem. Such parameters that may be adjusted include, for example, the power and/or intensity of the first electron beam 110 and/or the scanning (or rastering) speed of the first electron beam 110, and/or the path (including the turning positions and/or rates) of the first electron beam 110. In this way, recurring defects may be avoided. Any one or more of the processing and/or control steps involved in identifying such "stacking defects" and adjusting parameters accordingly may be carried out by a processor 550.

After any identified defects 330 have been removed, the layer 320 (or at least a part thereof, for example in the region of the identified defect(s) 330) may be re-scanned by the second electron beam 510 to check for any remaining defects 330. The process of identifying and optionally removing defects may then be iterated as required.

By identifying defects 330 in-situ in the solidified layers 320, not only may post-manufacture testing/inspection be avoided, but the final component 300 may be of a higher quality. For example, if the identified defects are subsequently removed (as described above, for example), then the final component 300 would contain fewer defects than would otherwise be the case, and thus may be considered to be of higher quality. For example, the finished component 300 may contain fewer voids. This may enable the components 300 to be used for applications requiring higher quality components (for example with better mechanical properties, such as strength and/or stiffness and/or durability). Additionally or alternatively, identifying and removing defects 330 in-situ may eliminate the need to perform additional manufacturing steps after the component 300 leaves the ALM machine 10. For example, identifying and removing defects 330 in-situ may avoid the need to perform an additional HIP step that may otherwise be required.

Figure 5:
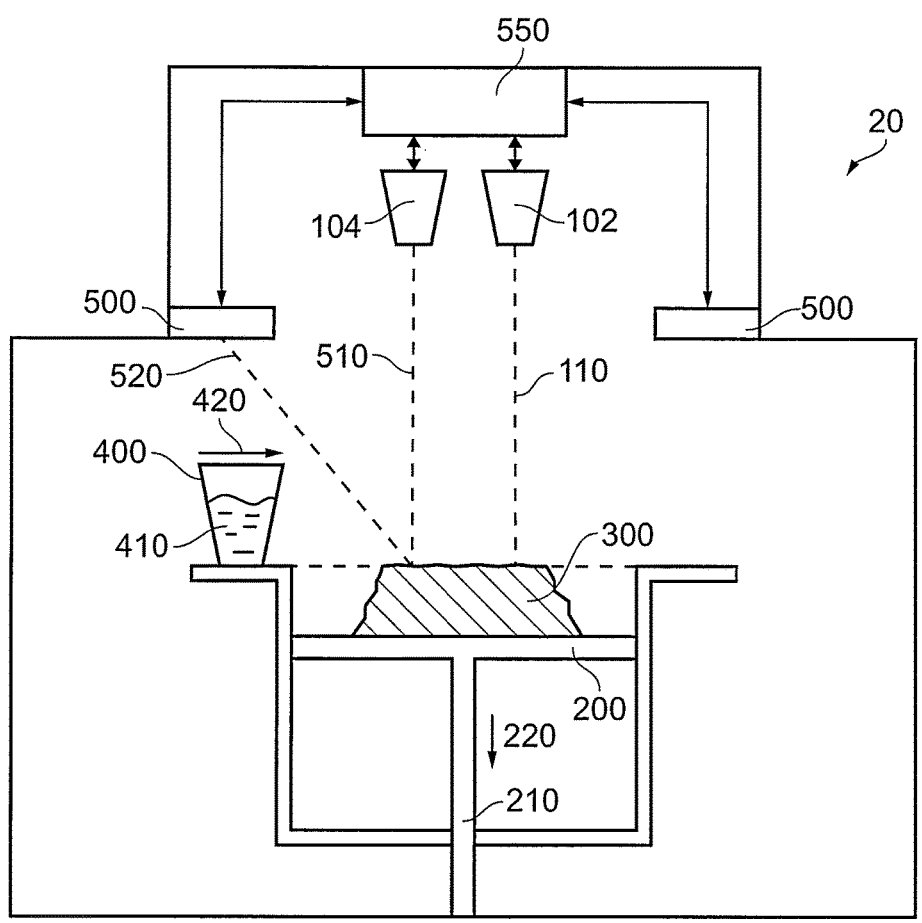
FIG. 5 shows another additive layer manufacture machine in accordance with the invention.

FIG. 5 shows an alternative example of an ALM machine 20 for use with the invention. The operation of the ALM machine 20 of FIG. 5, and the advantages associated therewith, is substantially the same as the ALM machine 10 of FIGS. 1 and 2, except in that the ALM machine 20 of FIG. 5 comprises two electron beam sources 102, 104, rather than just one electron beam source 100. As such, like features of the FIG. 5 and FIGS. 1 and 2 ALM machines are given like reference numerals, and the discussion provided herein may relate to either example. Similarly, the layer 320 and the image 620 thereof shown FIGS. 3 and 4, together with the associated discussion applies to the example shown in FIG. 5, as well as the example shown in FIGS. 1 and 2.

In FIG. 5, a first electron beam source 102 is provided to generate the first electron beam (melting beam) 110. A second electron beam source 104 is provided to generate the second electron beam (inspection beam) 510. The first electron beam source 102 and/or the second electron beam source 104 may be in communication with the controller 550, which may provide control signals, for example as described above in relation to FIGS. 1 and 2. The second electron beam source 104 may generate a second electron beam 510 that has different properties to the first electron beam 110 generated by the first electron beam source 102. For example, the second electron beam 510 may have a lower power and/or a lower intensity (for example lower maximum intensity) than the first electron beam 110, as with the example shown in FIGS. 1 and 2.

FIG. 5 shows both the first and second electron beams 110, 510, but it will be appreciated that the first electron beam 110 is used to perform the selective melting, and the second electron beam 510 is subsequently used to perform the inspection. Thus, the first and second electron beams may operate at different times. For example, the first electron beam 110 may be used to melt a layer 320, and subsequently the second electron beam 510 may be used to inspect that layer 320. However, the second electron beam 510 may be generated by its electron beam source 104 at the same time that the first electron beam 110 is generated by its electron beam source 102. For example, the second electron beam 510 may be used to inspect a part of a given layer 320 that has already been selectively melted and solidified at the same time as the first electron beam 110 is being used to selectively melt another part (or parts) of that same layer 320.

The proposed method and apparatus described herein may be used to manufacture any desired component using ALM, for example any suitable component of a gas turbine engine. Purely by way of example, the proposed method and apparatus may be used to manufacture aerofoil components (including turbine or compressor rotating blades or static stators), or other rotating or static structures. Indeed, the proposed method and apparatus may be used for a great many different components, across a great many different industries. Purely by way of non-limitative example, the proposed method and apparatus may be used to manufacture brackets, mountings and/or fixtures, gearboxes and components thereof, structural components for vehicles (such as roll hoops and/or impact bars for cars), fluid filters (such as oil filters), fluid injection equipment (such as oil jet nozzles), seals, heat exchangers, head and facial implants, and joint replacements (such as acetabular hip joints/cups) and may be used in any industry, such as aerospace, automotive and medical.

It will be appreciated that many alternative and/or optional features other than those explicitly described herein may fall within the scope of the invention. For example, it will be apparent that the invention may involve the use of many alternative configurations of ALM machine (for example in terms of layout, electron beam generators and/or detectors and relative movement of parts). Furthermore, any feature described and/or claimed herein may be combined with any other compatible feature described in relation to the same or another embodiment.

I claim:

1. A method of manufacturing a component using electron beam melting comprising:
   providing a powder layer;
   selectively melting at least a part of the powder layer so as to generate a solid layer of the component using a first electron beam;
   identifying any defects in the solid layer by scanning the solid layer using a second electron beam;
   removing any identified defects in the solid layer by using the first electron beam to re-melt at least a part of the solid layer; and then
   repeating the steps of providing the powder layer, selectively melting at least a part of the powder layer, identifying any defects in the solid layer, and removing any identified defects at least once so as to build up a shape corresponding to the component, wherein
   the power of the second electron beam is lower than the power of the first electron beam.

2. A method of manufacturing a component using electron beam melting according to claim 1, wherein the powder layer is a metal powder layer and the solid layer is a solid metallic layer.

3. A method of manufacturing a component according to claim 1, wherein the step of identifying defects in the solid layer comprises detecting back scattered electrons generated by the interaction of the second electron beam with the solid layer.

4. A method according to claim 1, further comprising repeating the step of identifying any defects in the solid layer by re-scanning at least a part of the solid layer using the second electron beam to confirm that the identified defects have been removed.

5. A method of manufacturing a component according to claim 1, further comprising storing data relating to the layer scanned by the second electron beam.

6. A method of manufacturing a component according to claim 5, further comprising:
   using the stored data to determine whether any defects have been identified at the same position in two or more different solid layers, such defects being recurring defects; and
   if any such recurring defects have been identified, adjusting one or more parameters of the selective melting step so as to avoid future recurring defects at that position.

7. A method of manufacturing a component according to claim 1, further comprising generating an image showing any identified defects in the solid layer.

8. A method of manufacturing a component according to claim 1, wherein the intensity of the second electron beam is lower than the intensity of the first electron beam.

9. A component manufactured using a method comprising the steps of claim 1.

10. An additive layer manufacturing machine for manufacturing a component, comprising:
    a base plate on which the component is manufactured;
    a powder delivery device configured to deliver successive layers of powder onto the baseplate;
    an electron beam source configured to generate a first electron beam to selectively melt at least a part of the powder layer so as to produce a solid layer, and to re-melt at least a part of the solid layer to remove any identified defects in the solid layer;
    the same or a different electron beam source configured to generate a second electron beam that scans the solid layer; and
    a backscatter detector configured to receive backscattered electrons from the surface of the solid layer resulting from the scan by the second electron beam;
    a processor configured to identify any defects in the solid layer, and to control the additive layer manufacturing machine to repeat powder layer delivery, selective melting, and identification and removal of defects at least once so as to build up a shape corresponding to the component, wherein:
    the second electron beam has a lower power than the first electron beam.

11. An additive layer manufacturing machine according to claim 10, wherein the electron beam source configured to generate the first electron beam is the same as the electron beam source configured to generate the second electron beam.

12. An additive layer manufacturing machine according to claim 10, wherein the electron beam source configured to generate the first electron beam is different than the electron beam source configured to generate the second electron beam.

13. An additive layer manufacturing machine according to claim 10, wherein the intensity of the second electron beam is lower than the intensity of the first electron beam.

14. A component manufactured using the apparatus of claim 10.

15. A method of manufacturing a component using electron beam melting comprising:
    providing a powder layer;
    selectively melting at least a part of the powder layer so as to generate a solid layer of the component using a first electron beam;
    identifying any defects in the solid layer by scanning the solid layer using a second electron beam;
    storing data relating to the solid layer scanned by the second electron beam;
    repeating the steps of providing the powder layer, selectively melting at least a part of the powder layer, identifying any defects in the solid layer, and storing the data relating to the scanned solid layer at least once so as to build up a shape corresponding to the component;
    using the stored data to determine whether any defects have been identified at the same position in two or more different solid layers, such defects being recurring defects; and if any such recurring defects have been identified, adjusting one or more parameters of the selective melting step so as to avoid future recurring defects at that position, wherein the power of the second electron beam is lower than the power of the first electron beam.

16. A method of manufacturing a component using electron beam melting according to claim 15, wherein the powder layer is a metal powder layer and the solid layer is a solid metallic layer.

17. A method of manufacturing a component according to claim 15, wherein:

if a defect is identified in the solid layer, the method further comprises making a decision about whether or not to remove any identified defects in the solid layer before providing the next powder layer; and the decision is based on one or more predetermined criteria.

18. A method of manufacturing a component according to claim 17, wherein the decision is based at least in part on at least one of the size of the defect, the shape of the defect and the position of the defect.

19. A method of manufacturing a component according to claim 17, wherein the decision is taken by a machine.

20. A method of manufacturing a component according to claim 17, wherein the decision is taken by an operator of the machine.

* * * * *